United States Patent
Shinohara et al.

(10) Patent No.: US 9,091,348 B2
(45) Date of Patent: Jul. 28, 2015

(54) SHAFT SEALING APPARATUS AND ROTATING MACHINE EQUIPPED THEREWITH

(71) Applicant: MITSUBISHI HEAVY INDUSTRIES, LTD., Tokyo (JP)

(72) Inventors: Tanehiro Shinohara, Tokyo (JP); Hidekazu Uehara, Tokyo (JP); Shin Nishimoto, Tokyo (JP); Hiroharu Oyama, Tokyo (JP); Takashi Nakano, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 13/737,115

(22) Filed: Jan. 9, 2013

(65) Prior Publication Data

US 2013/0181412 A1 Jul. 18, 2013

(30) Foreign Application Priority Data

Jan. 13, 2012 (JP) ................. 2012-005129

(51) Int. Cl.
*F16J 15/44* (2006.01)
*F16J 15/16* (2006.01)
*F16J 15/32* (2006.01)

(52) U.S. Cl.
CPC .............. *F16J 15/16* (2013.01); *F16J 15/3292* (2013.01)

(58) Field of Classification Search
CPC .................................. F16J 15/3288
USPC ....................................... 277/355
See application file for complete search history.

(56) References Cited

U.S. PATENT DOCUMENTS

| 6,267,381 B1 * | 7/2001 | Wright .......................... 277/355 |
| 7,066,468 B2 * | 6/2006 | Uehara et al. ................. 277/355 |
| 2002/0105146 A1 * | 8/2002 | Uehara et al. ................. 277/355 |

(Continued)

FOREIGN PATENT DOCUMENTS

| JP | 2002-013647 | 1/2002 |
| JP | 2003-113945 | 4/2003 |
| JP | 3616016 | 2/2005 |

(Continued)

OTHER PUBLICATIONS

International Search Report mailed Apr. 2, 2013 in International (PCT) Application No. PCT/JP2013/050311 with English translation.

(Continued)

*Primary Examiner* — Gilbert Lee
(74) *Attorney, Agent, or Firm* — Wenderoth, Lind & Ponack, L.L.P.

(57) ABSTRACT

A shaft sealing apparatus is installed in an annular space between a rotor and a stator in a rotating machine and divides the annular space into a low-pressure side region and a high-pressure side region in an axial direction of the rotor. The shaft sealing apparatus includes a seal body formed by stacking a plurality of thin seal pieces, which extend from the stator toward a radial inner side of the rotor, in a circumferential direction of the rotor, and lateral plates having a surface facing the axial direction and curved and extending in a circumferential direction of the annular space. The seal body is welded to the surfaces of the lateral plates which face the axial direction so that the seal body follows a curved shape of the lateral plates.

15 Claims, 10 Drawing Sheets

(56) References Cited

U.S. PATENT DOCUMENTS

2007/0085277 A1    4/2007    Rhodes et al.
2007/0102886 A1*    5/2007    Uehara et al. ............... 277/355

FOREIGN PATENT DOCUMENTS

| JP | 3872800 | 1/2007 |
|---|---|---|
| JP | 2008-116045 | 5/2008 |
| JP | 2008-275158 | 11/2008 |
| JP | 2009-243685 | 10/2009 |
| JP | 2009281437 A * | 12/2009 |
| WO | 00/03164 | 1/2000 |
| WO | 2009/113350 | 9/2009 |

OTHER PUBLICATIONS

Written Opinion of the International Searching Authority mailed Apr. 2, 2013 in International (PCT) Application No. PCT/JP2013/050311 with English translation.

* cited by examiner

SHAFT SEALING APPARATUS AND ROTATING MACHINE EQUIPPED THEREWITH

FIELD OF THE INVENTION

The present invention relates to a shaft sealing apparatus that seals an annular space between a rotor and a stator to divide the annular space into a low-pressure side region and a high-pressure side region, and a rotating machine equipped with the same.

Priority is claimed on Japanese Patent Application No. 2012-005129 filed on Jan. 13, 2012, the content of which is incorporated herein by reference.

BACKGROUND ART

To reduce a leakage amount of working fluid flowing from a high-pressure side to a low-pressure side, a shaft sealing apparatus is installed around a rotor in a rotating machine such as a gas turbine or a steam turbine. As an example of the shaft sealing apparatus, for example, the shaft sealing apparatus disclosed in Patent Document 1 below is known.

Such a shaft sealing apparatus is equipped with a housing installed on a stator, and a seal body made up of numerous thin seal pieces.

The seal body is configured so that the numerous thin seal pieces are mutually stacked with microgaps with a thickness direction of each thin seal piece directed in a circumferential direction of a rotor. Every thin seal piece is slantingly disposed so that a radial inner end (front end) thereof is located at a position closer to a rotating-direction front side of the rotor than a radial outer end (rear end) thereof. The thin seal pieces are configured so that the rear ends thereof are connected to one another, and so that the front ends thereof are free ends.

In the shaft sealing apparatus schematically configured in this way, when the rotor stands still, the front end of each thin seal piece is in contact with the rotor. In contrast, when the rotor rotates, the front end of each thin seal piece is raised from an outer circumference of the rotor and comes out of contact with the rotor due to a dynamic pressure effect caused by the rotation of the rotor. For this reason, in the shaft sealing apparatus, the wear of each thin seal piece is suppressed, and a seal service time is increased.

Figure 11:
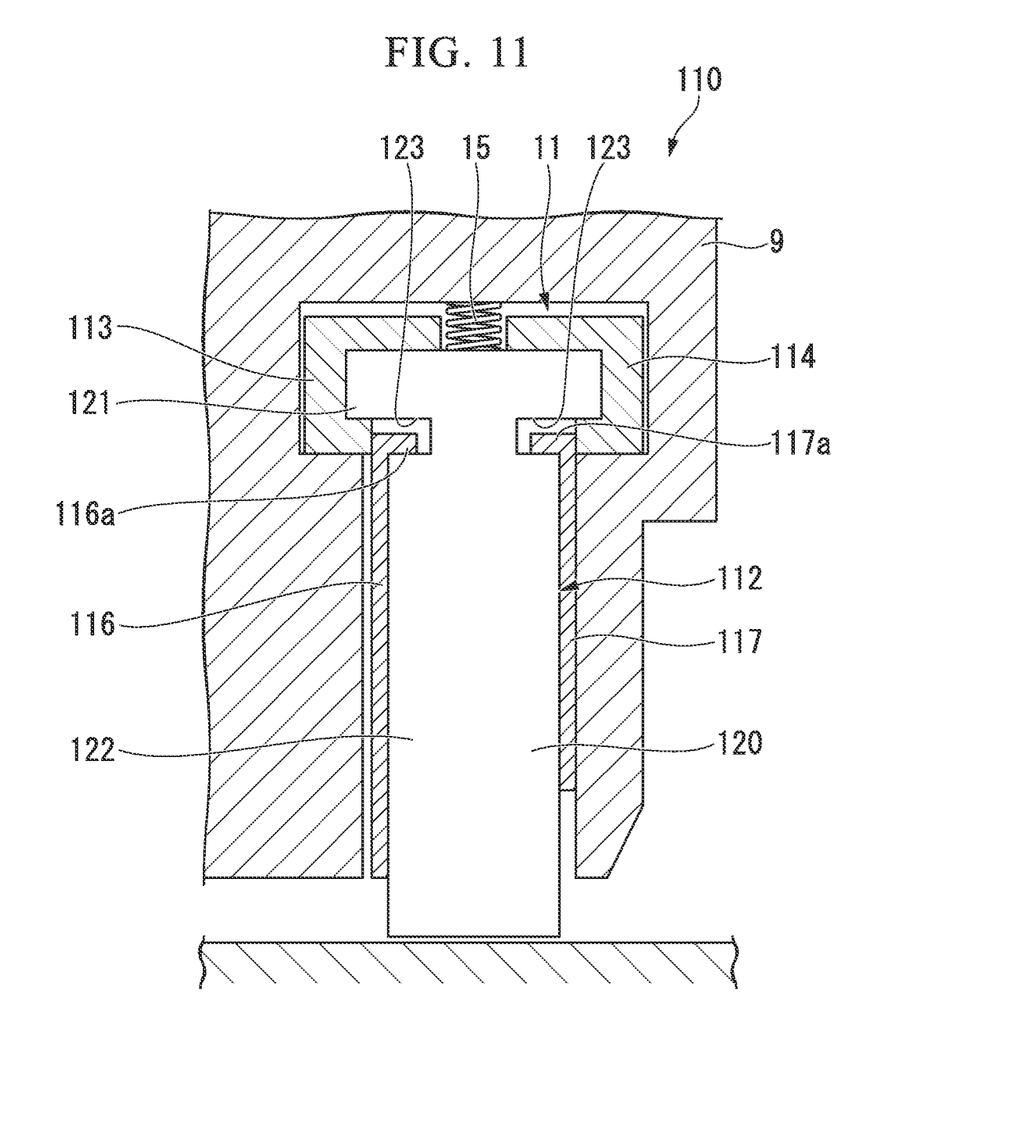
FIG. 11 is a cross-sectional view of a conventional shaft sealing apparatus.

FIG. 11 is a schematic configuration view of a conventional shaft sealing apparatus 110. The shaft sealing apparatus 110 is configured so that a plurality of seal segments 111 extending in a circular arc shape are disposed in a toric housing 9 supported on an inner circumferential surface of a stator.

The seal segment 111 is made up of a seal body 112 composed of numerous thin seal pieces 120, holding rings 113 and 114 having a U-shaped cross section and holding the numerous thin seal pieces 120, and high-pressure side lateral plate 116 and low-pressure side lateral plate 117 installed with the seal body 112 interposed therebetween in an axial direction of the rotor.

The holding rings 113 and 114 are members for holding head parts 121 of the numerous thin seal pieces 120. Further, rotor radial outer ends of the high-pressure side lateral plate 116 and low-pressure side lateral plate 117 are formed with protrusion parts 116a and 117a directed in the axial direction. The protrusion parts 116a and 117a are held so as to be prevented from falling off in a radial direction by the holding rings 113 and 114 in a state in which they are inserted into dents 123 between the head parts 121 and body parts 122 of the thin seal pieces 120.

RELATED ART DOCUMENTS

Patent Documents

[Patent Document 1] Japanese Patent No. 3616016

DISCLOSURE OF THE INVENTION

Problems to be Solved by the Invention

Incidentally, the shaft sealing apparatus 110 of the above configuration is configured so that the holding rings 113 and 114 constituting the seal segment 111 hold the high-pressure side lateral plate 116 and low-pressure side lateral plate 117. Due to the existence of the holding rings 113 and 114, the shaft sealing apparatus 110 has a rotor radial length of, for instance, 30 to 40 mm and a width of, for instance, 15 mm, and thus is voluminous. As a result, due to the restriction of a mounting space, application fields are limited.

The present invention has been made in consideration of these circumstances, and an object of the present invention is to provide a shaft sealing apparatus that is made smaller to allow application fields to be widened, and a rotating machine equipped with the same.

Means for Solving the Problems

To accomplish the above object, the present invention provides the following means.

According to a first aspect of the present invention, there is provided a shaft sealing apparatus that is installed in an annular space between a rotor and a stator surrounding an outer circumferential side of the rotor and that divides the annular space into a low-pressure side region and a high-pressure side region in an axial direction of the rotor, and that includes a seal body formed by stacking a plurality of thin seal pieces, which extend from the stator toward a radial inner side of the rotor, in a circumferential direction of the rotor, and lateral plates having a surface facing the axial direction and curved and extending in a circumferential direction of the annular space. The seal body is welded to the surfaces of the lateral plates which face the axial direction so that the seal body follows a curved shape of the lateral plates.

According to the above configuration, the lateral plates are welded to the seal body. Thereby, the member for holding the lateral plates together with the thin seal piece can be omitted. This allows the shaft sealing apparatus to be made smaller.

Further, according to a second aspect of the present invention, it is preferable that in the shaft sealing apparatus, the lateral plates are made up of a high-pressure side lateral plate disposed so as to follow a high-pressure side of the seal body and a low-pressure side lateral plate disposed so as to follow a low-pressure side of the seal body, and the seal body is welded to the surfaces of the high-pressure side lateral plate and low-pressure side lateral plate which face the axial direction.

Further, according to a third aspect of the present invention, it is preferable that the shaft sealing apparatus further includes a protection plate having a surface facing the radial direction of the rotor and curved and extending in the circumferential direction of the annular space. The protection plate may be welded to a radial outer end of the seal body.

According to the configuration, a protecting function of the shaft sealing apparatus can be further improved. Further, since the exposure of the seal body is reduced, the handling of the seal segment is made easier. Furthermore, by welding the protection plate, a connection between the plurality of thin seal pieces constituting the seal body can be further reinforced.

Further, according to a fourth aspect of the present invention, it is preferable that in the shaft sealing apparatus, the high-pressure side lateral plate is formed with an elastic element pressurizing a part of the high-pressure side lateral plate from the high-pressure side region toward the low-pressure side region.

According to the configuration, the elastic element pressurizes the high-pressure side lateral plate from the high-pressure side to the low-pressure side. Thereby, the high-pressure side lateral plate is allowed to reliably follow the thin seal piece, and vibration of the high-pressure side lateral plate can be suppressed. In other words, the elastic element constantly applies pressure to the high-pressure side lateral plate 16F. Thereby, an operation of the shaft sealing apparatus can be stabilized.

Further, according to a fifth aspect of the present invention, there is provided a rotating machine equipped with the shaft sealing apparatus.

Effects of the Invention

According to the above-mentioned shaft sealing apparatus, the lateral plates are welded to the seal body. Thereby, the member for holding the lateral plates together with the thin seal piece can be omitted. This allows the shaft sealing apparatus to be made smaller.

MODES FOR CARRYING OUT THE INVENTION

First Embodiment

Hereinafter, a rotating machine according to a first embodiment of the present invention will be described with reference to the drawings.

Figure 1:
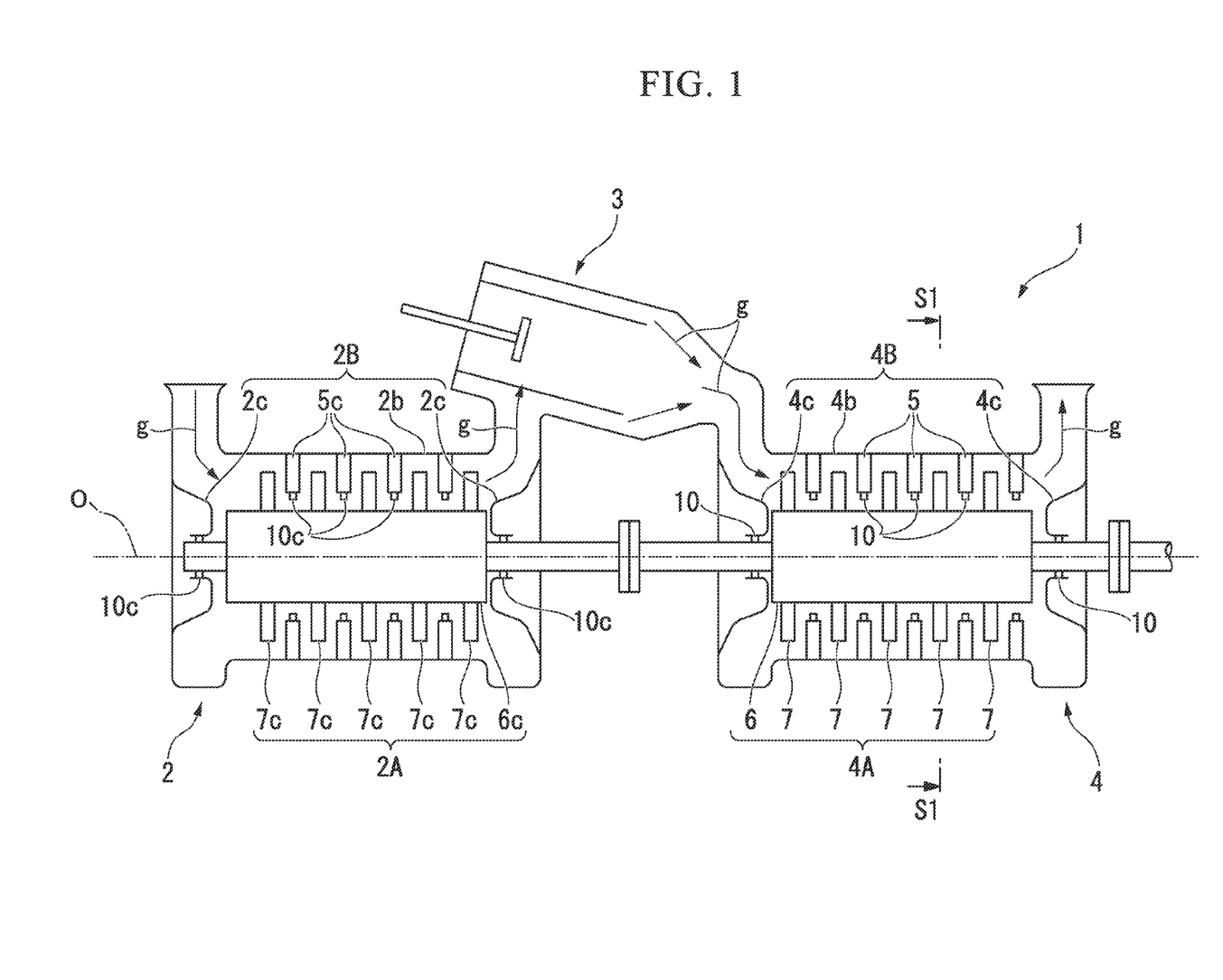
FIG. 1 is a schematic entire configuration view of a gas turbine (rotating machine) according to a first embodiment of the present invention.

FIG. 1 is a schematic entire configuration view of a gas turbine (rotating machine) 1 according to a first embodiment of the present invention.

As shown in FIG. 1, the gas turbine 1 includes a compressor (rotating machine) 2 which introduces and compresses a great amount of air thereinto, a combustor 3 which mixes fuel into the compressed air compressed by the compressor 2 and burns, and a gas turbine (rotating machine) 4 which converts thermal energy of the combustion gas introduced from the combustor 3 into rotational energy.

The compressor 2 and the turbine 4 include rotors 2A and 4A connected so as to be rotated together, and stators 2B and 4B surrounding outer circumference sides of the rotors 2A and 4A, respectively. Note that, in the following description, unless specifically defined otherwise, directions along the axis O of the rotors 2A and 4A are simply referred to as an "axis O direction," circumferential directions of the rotors 2A and 4A as a "circumferential direction," and radial directions of the rotors 2A and 4A as a "radial direction." Further, in the axis O direction of the rotors 2A and 4A, a high-pressure side is referred to as a "one side," and a low-pressure side as an "other side."

The rotors 2A and 4A have rotating shafts 6c and 6, and a plurality of annular rotor blade groups 7c and 7 fixed spaced apart from each other in the axis O direction. Each of the annular rotor blade groups 7c and 7 is configured to have a plurality of rotor blades, which are fixed to an outer circumference of each of the rotating shafts 6c and 6 and which are spaced apart from each other in the circumferential direction.

The stators 2B and 4B include casings 2b and 4b, and a plurality of annular stator vane groups 5c and 5, which are fixed in the casings 2b and 4b and which are spaced apart from each other in the axis O direction.

Each of the annular stator vane groups 5c and 5 has a plurality of stator vanes, which are fixed to an inner surface of each of the casings 2b and 4b and which are spaced apart from each other in the circumferential direction. A front end of each stator vane is formed with a hub shroud. The hub shrouds (stators) are connected in the circumferential direction, and surround the outer circumferences of the rotating shafts 6c and 6 in a toric shape as a whole. The stator blades of the annular stator vane groups 5c and 5 are disposed alternately with the rotor vanes of the plurality of annular rotor blade groups 7c and 7 in the axis O direction.

In the compressor 2 and the turbine 4, to prevent a working fluid (compressed air or combustion gas) g from leaking out from the high-pressure side to the low-pressure side in the axis O direction, as shown in FIG. 1, the shaft sealing apparatuses 10c and 10 are installed on the hub shrouds of the respective annular stator vane groups 5c and 5. Further, the shaft sealing apparatuses 10c and 10 are also installed on bearing parts (stators) 2c and 4c on which the casings 2b and 4b support the rotating shafts 6c and 6 in order to prevent the working fluid g from leaking out from the high-pressure side to the low-pressure side.

Hereinafter, an embodiment of the shaft sealing apparatus 10 of the turbine 4 will be described. Although the following description will be given of the shaft sealing apparatus 10 of the turbine 4, the shaft sealing apparatus 10c of the compressor 2 basically has a similar configuration, and a description thereof will be omitted here.

Figure 2:
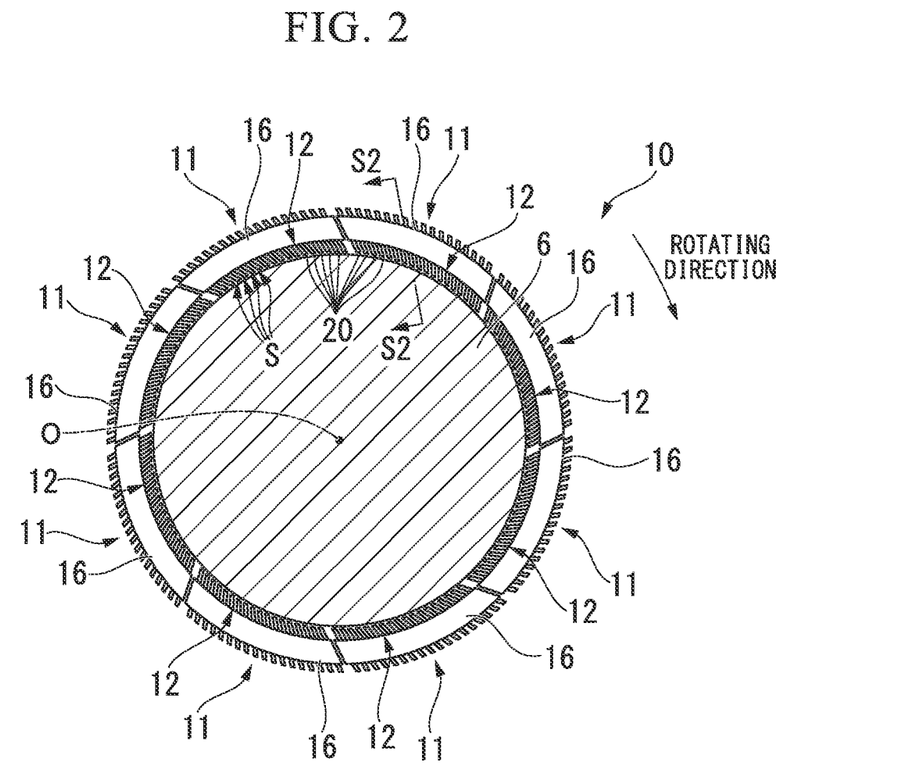
FIG. 2 is a cross-sectional view taken along the line S1-S1 in FIG. 1.
Figure 3:
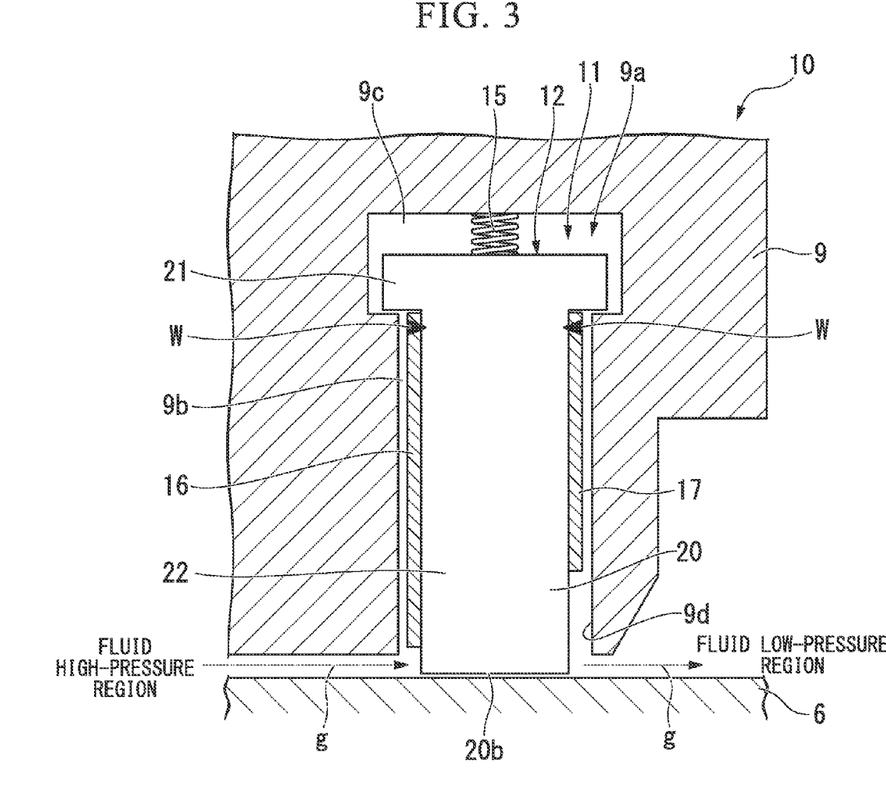
FIG. 3 is a cross-sectional view that shows a shaft sealing apparatus according to the first embodiment of the present invention and is taken along the line S2-S2 in FIG. 2.

FIG. 2 is a cross-sectional view taken along the line S1-S1 in FIG. 1, and FIG. 3 is a cross-sectional view taken along the line S2-S2 in FIG. 2.

As shown in FIG. 2, the shaft sealing apparatus 10 of the turbine 4 is configured so that a plurality of seal segments 11 (in the present embodiment, eight seal segments) extending in an circular arc shape are disposed in a housing 9, which is an annular space supported on each of the hub shroud of the annular stator vane group 5 and an inner circumferential surface of the bearing part 4c, in the circumferential direction. The seal segments 11 are segmented so as to be directed toward a rotating-direction front side as they are directed from a radial outer side toward a radial inner side.

The housing 9 extends along the outer circumference of the rotating shaft 6 throughout the circumference, and is provided with a toric receiving space 9a. As shown in FIG. 3, the receiving space 9a of the housing 9 is configured so that a portion of an opening side, i.e., a radial inner side, thereof is configured to be an inner space 9b whose width dimension (dimension of the axis O direction) is formed so as to be small. Further, a space spaced apart from an opening of the receiving space 9a to the radial outer side, i.e., a space of the radial outer side farther than the inner space 9b, is configured to be an outer space 9c whose width dimension is formed so as to be large. The inner space 9b and the outer space 9c are in communication with each other. Thus, the opening part 9d of the inner space 9b is directed to the rotating shaft 6 of the radial inner side.

As shown in FIG. 3, each seal segment 11 is made up of a seal body 12 composed of a number of thin seal pieces 20 (see FIG. 4), an elastic body 15 urging the seal body 12 toward the radial inner side, and high-pressure side lateral plate 16 and low-pressure side lateral plate 17 installed with the seal body 12 interposed therebetween in the axis O direction.

Figure 4:
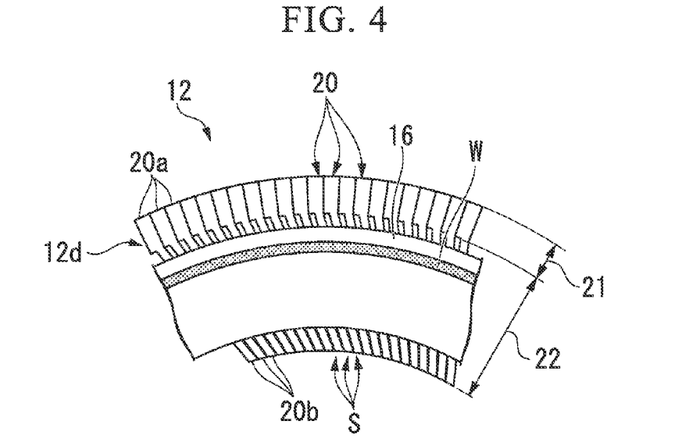
FIG. 4 is a cross-sectional view of the shaft sealing apparatus according to the first embodiment of the present invention from one side to the other side in an axial direction.

FIG. 4 is a schematic view of the seal segment 11 viewed from a one side to an other side in the axis O direction.

As shown in FIG. 4, the seal body 12 is configured so that sheet-shaped thin seal pieces 20 are numerously stacked (see FIG. 2), and so that radial outer ends of the numerous thin seal pieces 20, i.e., rear ends 20a of the thin seal pieces 20, are connected to one another. As shown in FIG. 2, the numerous thin seal pieces 20 are arranged so as to be directed to the rotating-direction front side as they are directed from the radial outer side toward the radial inner side.

Further, the thin seal piece 20 is a member that is mainly formed of a thin steel sheet, is formed in a T shape when viewed from the circumferential direction of the rotating shaft 6 as shown in FIG. 3, and is disposed so that a width direction thereof is directed in the axis O direction of the rotating shaft 6. In other words, the thin seal piece 20 is disposed so that a thickness direction thereof is directed in the circumferential direction of the rotating shaft 6.

The thin seal piece 20 has a head part 21 and a body part 22 whose width and thickness dimensions are formed so as to be smaller than those of the head part 21. The thin seal piece 20 is formed from the radial outer side toward the radial inner side of the rotating shaft 6 so as to continue in the order of the head part 21 and the body part 22.

The numerous thin seal pieces 20 are connected to each other in such a manner that the head parts 21 thereof are welded to one another. Further, the body parts 22 of the numerous thin seal pieces 20 are allowed to undergo elastic deformation. Radial inner ends of the body parts 22, i.e., front ends 20b of the thin seal pieces 20, become free ends. Thus, during a shutdown period of the rotating shaft 6, a side of the front end 20b of each thin seal piece 20 is configured so as to be in contact with the rotating shaft 6 under a predetermined pre-pressure.

As shown in FIG. 4, the numerous thin seal pieces 20 are arranged in the circumferential direction with microgaps s therebetween. By making a thickness dimension of the head part 21 larger than that of the body part 22, the numerous thin seal pieces 20 form the microgaps s between the body parts 22 of the two thin seal pieces 20 that are adjacent to each other in the thickness direction thereof.

All of the high-pressure side lateral plate 16 and the low-pressure side lateral plate 17 are configured so that the thickness direction thereof is directed in the axis O direction, and so that a shape thereof which is viewed from the axis O direction of the rotating shaft 6 is a circular arc band shape. That is, the high-pressure side lateral plate 16 and the low-pressure side lateral plate 17 have a surface facing the axis O direction, and are formed so as to be curved and extend in a circumferential direction of the receiving space 9a. Further, a radial dimension of the low-pressure side lateral plate 17 is set to be shorter than that of the high-pressure side lateral plate 16.

All of the high-pressure side lateral plate 16 and the low-pressure side lateral plate 17 are welded to the seal body 12 at the weld zone W of the radial outer end thereof. The high-pressure side lateral plate 16 and the low-pressure side lateral plate 17 are welded to the seal body 12 along the circumferential direction, and the weld zones W are also curved and extend in the circumferential direction. Thereby, the plate surface of the high-pressure side lateral plate 16 which faces the low-pressure side of the high-pressure side lateral plate 16 is fixed so as to cover the high-pressure side of the seal body 12, and the plate surface of the low-pressure side lateral plate 17 which faces the high-pressure side of the low-pressure side lateral plate 17 is fixed so as to cover the low-pressure side of the seal body 12.

As a welding method used for this welding, for example, laser welding, TIG welding, and so on may be applied. However, the welding method is not limited thereto.

Further, in the event of the welding, to make the quality of the welding good, lateral surfaces of the seal body 12 may be polished, thereby removing irregularity therefrom.

Further, it is preferable that the welding is continuously performed in the circumferential direction. However, if there is a concern of warpage of the thin seal piece 20 caused by the welding, spot welding may be performed at predetermined intervals.

In the present embodiment, the radial inner end of the high-pressure side lateral plate 16, i.e., the front end of the high-pressure side lateral plate 16, extends up to the opening of the radial inner side of the receiving space 9a. Thereby, the front end 20b of the thin seal piece 20 extending out from the receiving space 9a toward the radial inner side extends out to the radial inner side farther than the front end of the high-pressure side lateral plate 16.

Further, in the present embodiment, the radial inner end of the low-pressure side lateral plate 17, i.e., the front end of the low-pressure side lateral plate 17, is located farther toward the radial outer side than the opening of the radial inner side of the receiving space 9a.

As shown in FIG. 3, the seal segment 11 is housed in the receiving space 9a of the housing 9 with an allowance.

In greater detail, the head part 21 of the thin seal piece 20 is housed in the outer space 9c of the receiving space 9a, and the high-pressure side lateral plate 16 and low-pressure side lateral plate 17 and the body part 22 of the thin seal pieces 20 are housed in the inner space 9b of the receiving space 9a. The front end of the body part 22, i.e., the front end 20b of the thin seal piece 20, protrudes from the opening of the receiving space 9a toward the rotating shaft 6.

The seal segment 11 is configured so that the head part 21 of the thin seal piece 20 interferes with an inner wall of the outer space 9c of the housing 9 and is limited in radial displacement, and so that the high-pressure side lateral plate 16 and low-pressure side lateral plate 17 interfere with an inner wall of the inner space 9b of the housing 9 and are limited in displacement in the axis O direction within a predetermined range. Further, the seal segment 11 is biased toward the radial inner side by the elastic body 15 arranged in the outer space 9c.

According to the above embodiment, the high-pressure side lateral plate 16 and low-pressure side lateral plate 17 are welded to the seal body 12. Thereby, a member for holding the high-pressure side lateral plate 16 and low-pressure side lateral plate 17 along with the head part 21 of the thin seal piece 20 can be omitted. This allows the shaft sealing apparatus 10 to be made smaller.

Further, to fix the high-pressure side lateral plate 16 and low-pressure side lateral plate 17 to the seal body 12, it is unnecessary to form a groove in the thin seal piece 20 making up the seal body 12. As such, the thin seal piece 20 can be made short, and the sealing apparatus can be made smaller.

When the thin seal piece 20 is made short, the sheet thickness of the thin seal piece 20 is preferable to be reduced to prevent rigidity of the thin seal piece 20 from being excessive. In the case of the present embodiment, for example, it is preferable that the sheet thickness of 0.04 mm to 0.06 mm is employed.

Second Embodiment

Figure 5:
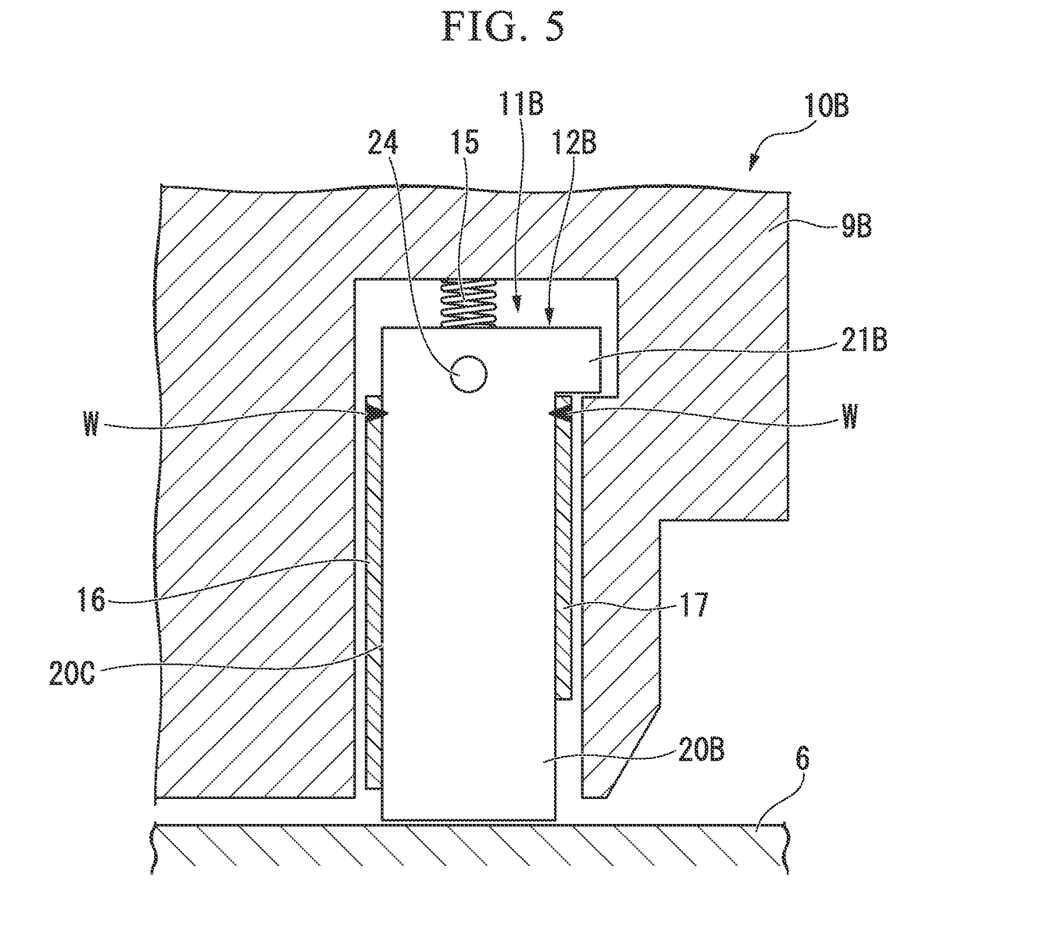
FIG. 5 is a cross-sectional view that shows a shaft sealing apparatus according to a second embodiment of the present invention and is taken along the line S2-S2 in FIG. 2.

Hereinafter, a shaft sealing apparatus 10B according to a second embodiment of the present invention will be described using FIG. 5. In this embodiment, members that are the same as the members used in the above-mentioned embodiment are given the same numerals, and a description thereof will be omitted here.

A thin seal piece 20B making up the shaft sealing apparatus 10B of the present embodiment is different from the thin seal piece 20 of the first embodiment in terms of the shape of the head part 21. The head part 21B of the thin seal piece 20B of the present embodiment protrudes only to the other side of the axis O direction. That is, a lateral end 20c of the one side of the axial direction of the thin seal pieces 20B has a linear shape. Further, a round hole 24 is formed in the vicinity of a radial outer end of the thin seal piece 20B.

According to the above-mentioned embodiment, the head part 21B is shaped so as to protrude only to one side of the axis O direction. Thereby, since the width of the axis O direction of the thin seal piece 20B is narrow, the shaft sealing apparatus can be made smaller.

Further, the round hole 24 is formed in the thin seal piece 20B. Thereby, when the thin seal piece 20B is combined as a seal body 12B, workability, for instance, during transport, can be improved.

Figure 6:
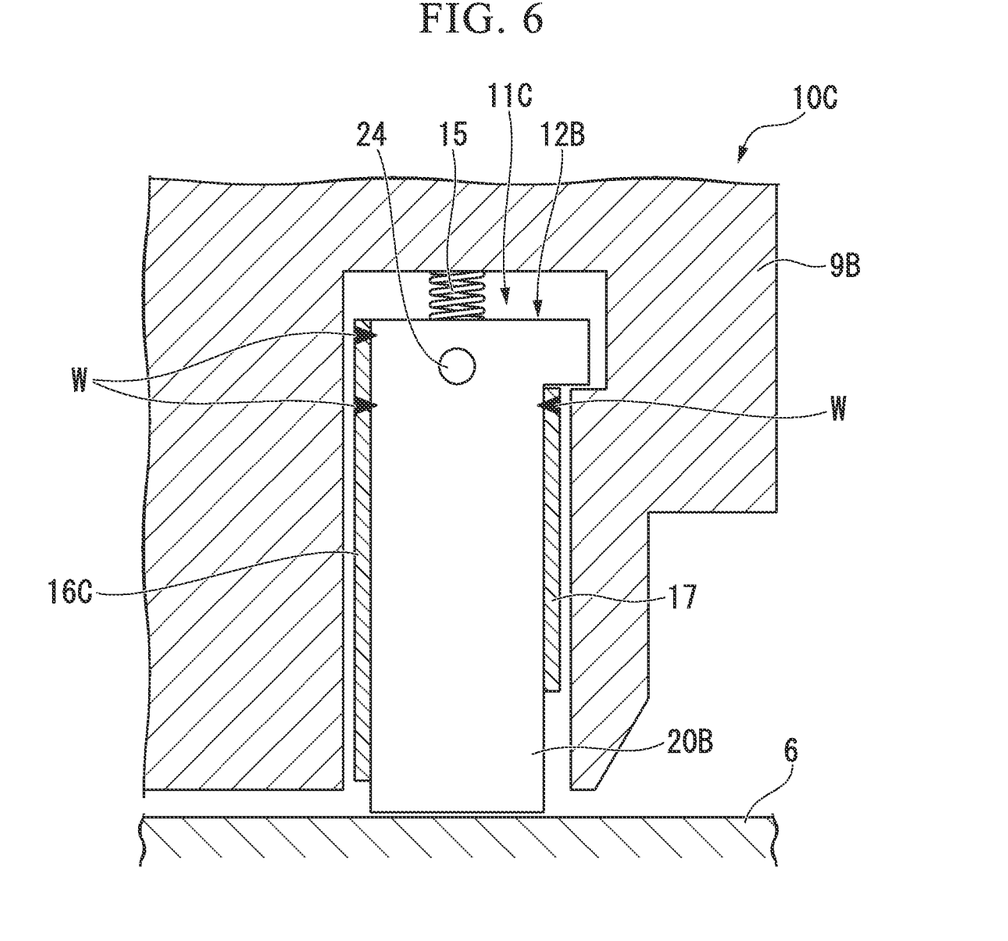
FIG. 6 is a cross-sectional view that shows a shaft sealing apparatus according to a modified example of the second embodiment of the present invention and is taken along the line S2-S2 in FIG. 2.

In the present embodiment, as in a shaft sealing apparatus 10C shown in FIG. 6, a high-pressure side lateral plate 16C may be configured to have a length up to the front end of the head part of the thin seal piece 20B, and a weld zone W may be set to two places corresponding to the length of the high-pressure side lateral plate 16C. With this configuration, the seal body 12 is more widely covered by the high-pressure side lateral plate 16C. As such, a protecting function of the shaft sealing apparatus can be further improved. Further, since the exposure of the seal body 12B is reduced, the handling of a seal segment 11C is made easier.

Third Embodiment

Figure 7:
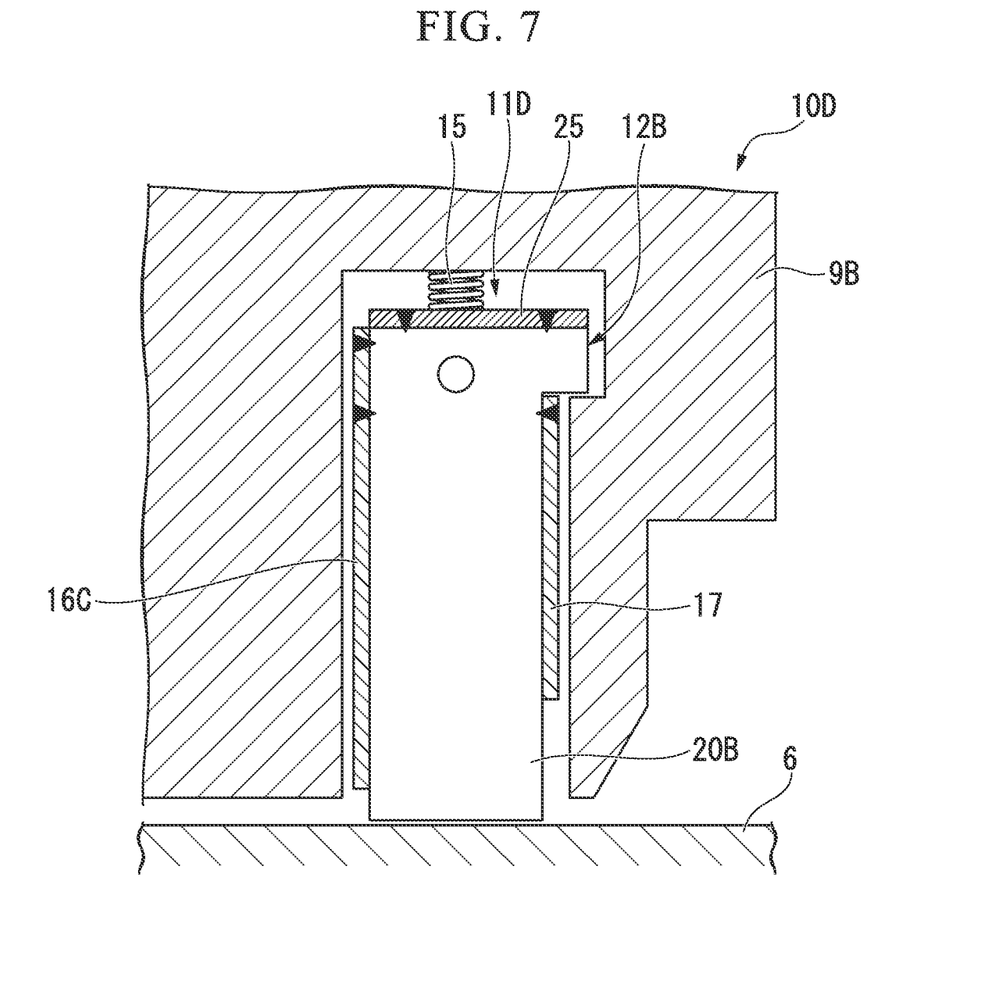
FIG. 7 is a cross-sectional view that shows a shaft sealing apparatus according to a third embodiment of the present invention and is taken along the line S2-S2 in FIG. 2.

Hereinafter, a shaft sealing apparatus 10D according to a third embodiment of the present invention will be described using FIG. 7. In this embodiment, members that are the same as the members used in the above-mentioned embodiment are given the same numerals, and a description thereof will be omitted here.

In the shaft sealing apparatus 10D of the present embodiment, a protection plate 25 is welded on a radial outer side of a seal body 12B making up a seal segment 11D. The protection plate 25 is pressed so as to be curved corresponding to a radial outer surface of the seal body 12B. The thickness of the protection plate 25 may be set to a range of, for instance, 0.5 mm to 1.0 mm.

According to the above-mentioned embodiment, a protecting function of the shaft sealing apparatus 10D can be further improved. Further, since the exposure of the seal body 12B is reduced, the handling of the seal segment 11D is made easier. Furthermore, by welding the protection plate 25, a connection between a plurality of thin seal pieces 20B constituting the seal body 12B can be further reinforced.

Figure 8:
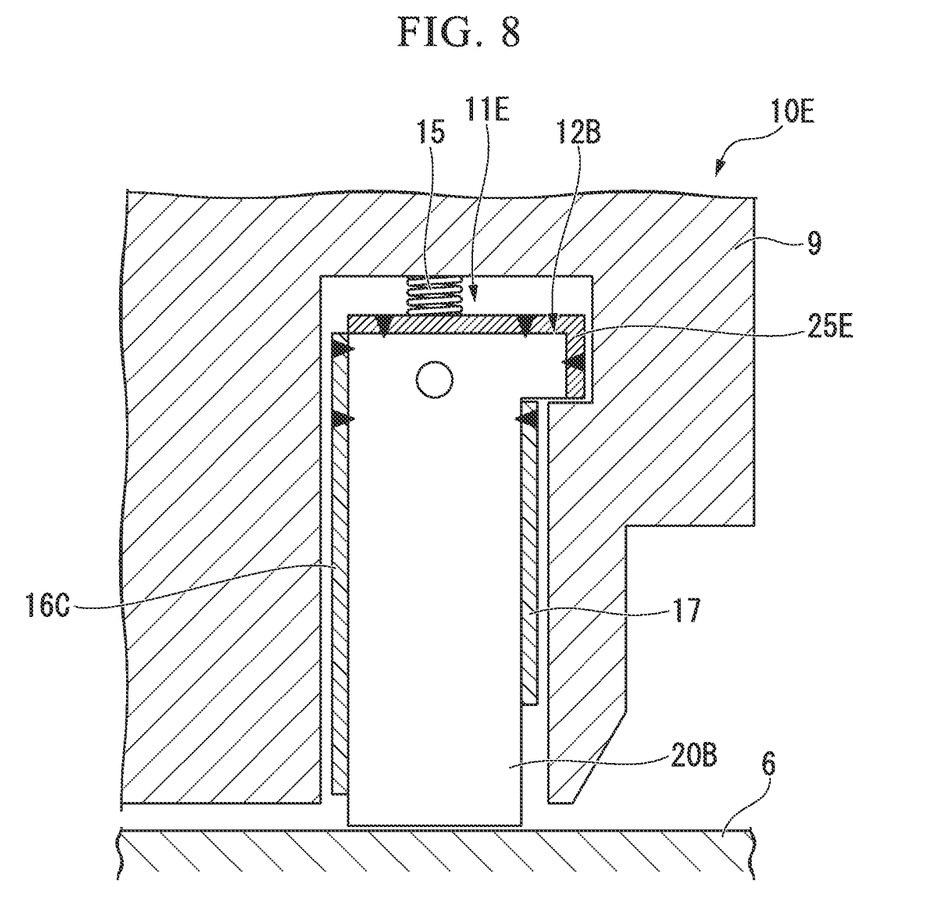
FIG. 8 is a cross-sectional view that shows a shaft sealing apparatus according to a modified example of the third embodiment of the present invention and is taken along the line S2-S2 in FIG. 2.

As a modified example of the present embodiment, as shown in FIG. 8, a protection plate 25E may also be shaped so as to cover the other side of the axis O direction of an upper portion of the seal body 12B. With this configuration, the protecting function of the shaft sealing apparatus 10E can be further improved.

Fourth Embodiment

Hereinafter, a shaft sealing apparatus 10F according to a fourth embodiment of the present invention will be described using FIG. 9. In this embodiment, members that are the same as the members used in the above-mentioned embodiment are given the same numerals, and a description thereof will be omitted here.

Figure 9:
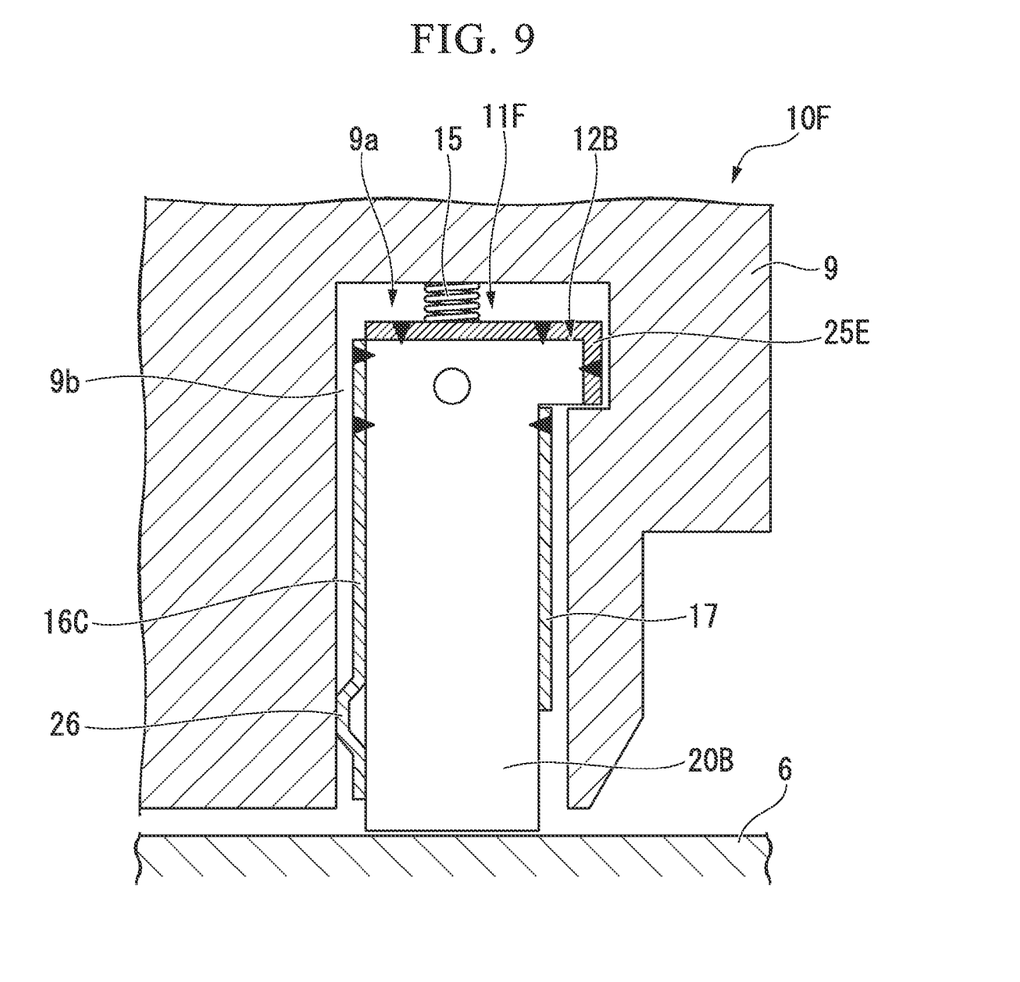
FIG. 9 is a cross-sectional view that shows a shaft sealing apparatus according to a fourth embodiment of the present invention and is taken along the line S2-S2 in FIG. 2.

In the shaft sealing apparatus 10F of the present embodiment, a plurality of dimples 26 are provided on a high-pressure side lateral plate 16F making up a seal segment 11D (only one dimple is shown in FIG. 9). The dimples 26 are provided so as to protrude in a radial direction in the vicinity of a radial inner end of the high-pressure side lateral plate 16F. In detail, the dimples 26 are provided by pressing the high-pressure side lateral plate 16F, and are each configured so that a cross section thereof when viewed from a circumferential direction has a convex shape at one side of the axis O direction. The plurality of dimples 26 are provided in the circumferential direction at predetermined intervals.

The dimple 26 is formed to such a height that the top of the dimple 26 is in contact with an inner surface of an inner space 9b of a receiving space 9a, or there is a slight gap between the top of the dimple 26 and the inner surface of the inner space 9b. By providing this shape, the dimple 26 fulfills a function as an elastic element. That is, a place at which the dimple 26 of the high-pressure side lateral plate 16F is formed is pressurized from the one side (high-pressure side) toward the other side (low-pressure side).

According to the above-mentioned embodiment, the dimples 26 pressurize the high-pressure side lateral plate 16F from the high-pressure side to the low-pressure side. Thereby, the high-pressure side lateral plate 16F is allowed to reliably follow the thin seal piece 20B, and vibration of the high-pressure side lateral plate 16F can be controlled. In other words, the dimples 26 constantly apply pressure to the high-pressure side lateral plate 16F. Thereby, an operation of the shaft sealing apparatus 10F can be stabilized.

Figure 10:
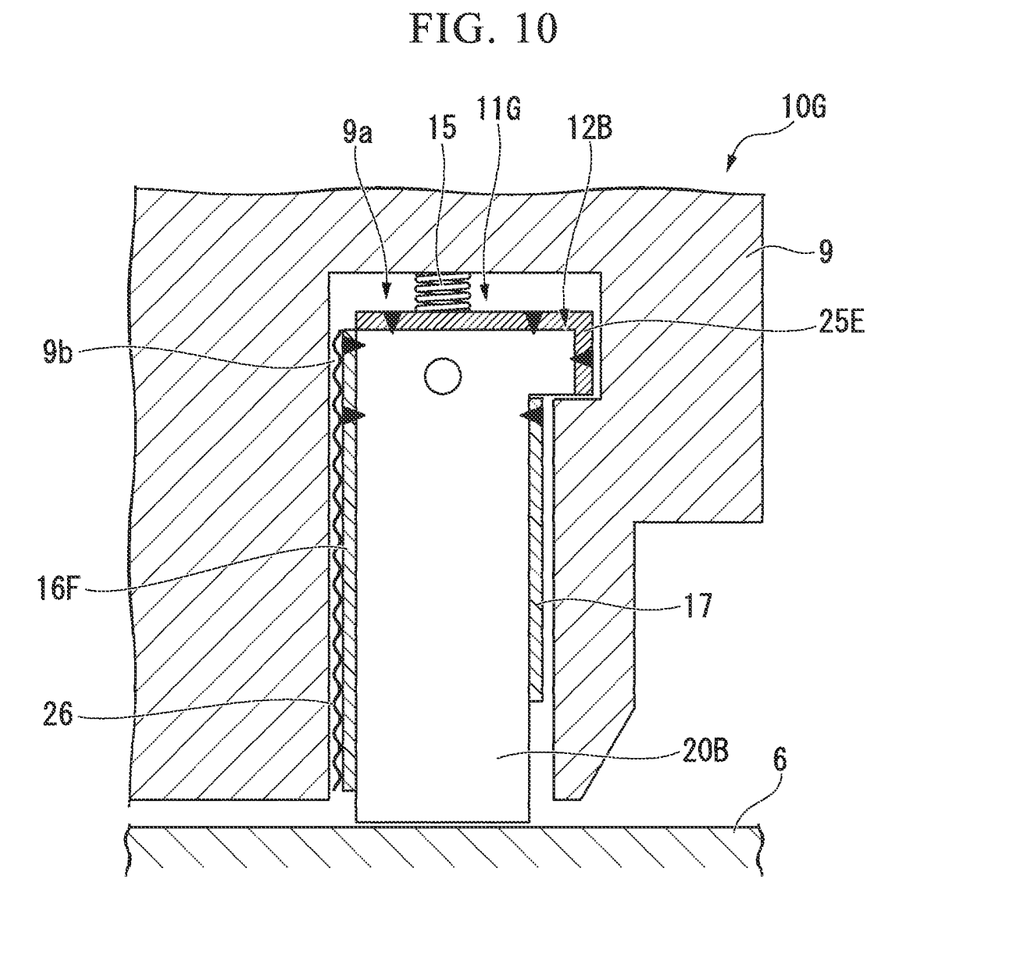
FIG. 10 is a cross-sectional view that shows a shaft sealing apparatus according to a modification of the fourth embodiment of the present invention and is taken along the line S2-S2 in FIG. 2.

As a modified example of the present embodiment, as shown in FIG. 10, a configuration in which a wavy plate 27 whose shape viewed from the axis O direction has approximately the same shape as a high-pressure side lateral plate 16C is installed on the one side (high-pressure side) of the axis O direction of the high-pressure side lateral plate 16C may also be employed. The wavy plate 27 is a sheet-shaped member that is formed of, for instance, spring steel and that is alternately bent to the one side of the axis O direction and to the other side of the axis O direction, and is attached to the one side of the axis O direction of the high-pressure side lateral plate 16C.

A dimension of the axis O direction of the wavy plate 27 is set to such a dimension as to bridge a gap between the high-pressure side lateral plate 16C and an inner surface of the inner space 9b.

Further, the wavy plate 27 is fixed to the high-pressure side lateral plate 16C by adhesion.

According to the above-mentioned embodiment, the wavy plate 27 is interposed between the high-pressure side lateral plate 16C and the inner surface of the inner space 9b of the receiving space 9a. Thereby, in addition to the effects of the fourth embodiment, the wavy plate can pressurize the high-pressure side lateral plate 16C over an entire surface of the high-pressure side lateral plate 16C. Accordingly, the high-pressure side lateral plate 16C is allowed to follow the entire area of the thin seal pieces 20B.

INDUSTRIAL APPLICABILITY

According to the above-mentioned shaft sealing apparatus, the lateral plates are welded to the seal body. Thereby, the member for holding the lateral plates together with the thin seal piece can be omitted. This allows the shaft sealing apparatus to be made smaller.

DESCRIPTION OF REFERENCE NUMERALS

O . . . axis
1 . . . gas turbine (rotating machine)
2 . . . compressor (rotating machine)
4 . . . gas turbine (rotating machine)
2A, 4A . . . rotor
2B, 4B . . . stator
9a . . . receiving space (annular space)
10 . . . shaft sealing apparatus
11 . . . seal segment
12 . . . seal body
16 . . . high-pressure side lateral plate (lateral plate)
17 . . . low-pressure side lateral plate (lateral plate)
20 . . . thin seal piece
25 . . . protection plate
26 . . . dimple (elastic element)
27 . . . wavy plate (elastic element)

The invention claimed is:

1. A shaft sealing apparatus for installation in an annular space between a rotor and a stator surrounding an outer circumferential side of the rotor and that divides the annular space into a low-pressure side region and a high-pressure side region in an axial direction of the rotor, the shaft sealing apparatus comprising:

a seal body including a plurality of thin seal pieces that are stacked, the thin seal pieces extending from the stator toward a radial inner side of the rotor, in a circumferential direction of the rotor;
a plurality of lateral plates each having a surface facing the axial direction, the lateral plates being curved and extending in a circumferential direction of the annular space;
a housing installed on the stator and including a receiving space in which the seal body and the plurality of lateral plates are housed, the receiving space being formed on an inner circumference of the housing so as to be around the rotor; and
an elastic body configured to urge the seal body toward the radial inner side of the rotor with respect to the stator,
wherein the plurality of thin seal pieces are welded to the surfaces of the lateral plates so that the seal body follows a curved shape of the lateral plates,
wherein the receiving space includes an outer space, which is formed in a radial outer side of the rotor, and an inner space, which is in communication with the outer space via a step toward the radial inner side of the rotor and has a smaller width in the axial direction of the rotor than that of the outer space,
wherein the thin seal pieces each include a head part, which is housed in the outer space, and a body part, which is housed in the inner space and formed continuously with the head part, the body part having a smaller width in the axial direction of the rotor than that of the head part,
wherein the head parts are welded to each other to connect the thin seal pieces to each other,
wherein the elastic body is installed in the outer space of the receiving space so as to be interposed between the housing and the seal body and urges the seal body toward the radial inner side of the rotor to press the head parts to the step of the receiving space, and
wherein the head parts contact the housing.

2. The shaft sealing apparatus according to claim 1, wherein:
the lateral plates include a high-pressure side lateral plate disposed so as to follow a high-pressure side of the seal body and a low-pressure side lateral plate disposed so as to follow a low-pressure side of the seal body; and
the seal body is welded to the surfaces of the high-pressure side lateral plate and low-pressure side lateral plate which face the axial direction.

3. The shaft sealing apparatus according to claim 2, further comprising a protection plate having a surface facing a radial direction of the rotor, the protection plate being curved and extending in the circumferential direction of the annular space,
wherein the protection plate is welded to a radial outer end of the seal body.

4. The shaft sealing apparatus according to claim 3, wherein the high-pressure side lateral plate includes an elastic element pressurizing a part of the high-pressure side lateral plate from the high-pressure side region toward the low-pressure side region.

5. A rotating machine comprising the shaft sealing apparatus according to claim 4.

6. A rotating machine comprising the shaft sealing apparatus according to claim 3.

7. The shaft sealing apparatus according to claim 2, wherein the high-pressure side lateral plate includes an elastic element pressurizing a part of the high-pressure side lateral plate from the high-pressure side region toward the low-pressure side region.

8. A rotating machine comprising the shaft sealing apparatus according to claim 7.

9. A rotating machine comprising the shaft sealing apparatus according to claim 2.

10. The shaft sealing apparatus according to claim 1, further comprising a protection plate having a surface facing a radial direction of the rotor, the protection plate being curved and extending in the circumferential direction of the annular space,
wherein the protection plate is welded to a radial outer end of the seal body.

11. The shaft sealing apparatus according to claim 10, wherein the high-pressure side lateral plate includes an elastic element pressurizing a part of the high-pressure side lateral plate from the high-pressure side region toward the low-pressure side region.

12. A rotating machine comprising the shaft sealing apparatus according to claim 11.

13. A rotating machine comprising the shaft sealing apparatus according to claim 10.

14. A rotating machine comprising the shaft sealing apparatus according to claim 1.

15. The shaft sealing apparatus according to claim 1, wherein
the housing has a high pressure side and a low pressure side,
the high pressure side of the housing extends further toward the inner radial side of the rotor than one of the lateral plates adjacent to the high pressure side of the housing, and
the low pressure side of the housing extends further toward the inner radial side of the rotor than one of the lateral plates adjacent to the low pressure side of the housing.

* * * * *